Patented Sept. 25, 1951

2,568,747

UNITED STATES PATENT OFFICE 2,568,747

MIXED ESTER AMINE POLYBASIC ACID COMPOSITIONS

Willard H. Kirkpatrick, Sugar Land, Tex., and Earl T. Kocher, Bellflower, Calif., assignors to Visco Products Company, Houston, Tex., a corporation of Delaware No Drawing. Application June 11, 1949, Serial No. 98,626

9 Claims. (Cl. 260—22)

This invention relates to new and improved compositions adapted for the treatment of emulsions of mineral oil and water, such as petroleum emulsions commonly encountered in the production, handling and refining of crude mineral oil, for the purpose of separating the oil from the water. Also, the invention relates to compositions suitable for the treatment of other water-in-oil types of emulsions wherein the emulsions are produced artificially or naturally and the resolution of the emulsions presents a problem of recovery or disposal.

This application is a continuation-in-part of our copending application Serial Number 775,146, filed September 19, 1947.

Petroleum emulsions are, in general, of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One object of the invention is to provide a novel and useful composition for resolving emulsions of the character referred to into their component parts of oil and water or brine.

Another object of the invention is to provide a novel and useful composition for "desalting" of refinery crude charge stocks going to the stills. "Desalting" is the conventional term used to designate the operation wherein the salt content of crude oil is substantially reduced. This operation consists of artificially creating an emulsion of crude oil with water and subsequently resolving said emulsion by treatment with one of the reagents described herein.

Still another object of the invention is to provide a novel reagent which is water-wettable, interfacial and surface-active in order to enable its use as a demulsifier or for such uses where surface-active characteristics are necessary or desirable. Other objects will appear hereinafter.

The compositions provided in accordance with the present invention consist of a modified alkyd resin derived from the reaction of an alkylol amine, a polybasic carboxy acid, and a mixed ester of a polyhydric alcohol, preferably a polyalkylene glycol, of the kind obtained when a polyhydroxy organic compound, e. g., a polyalkylene glycol or derivative thereof, unites to form mixed esters with two dissimilar carboxy acids, one being an unsaturated long chain acyclic carboxy acid containing at least 8 carbon atoms and the other being an unsaturated carbocyclic acidic resin type carboxy acid, for instance, abietic acid. The modified alkyd resin results from the condensation of an organic dibasic acid with the above described mixed ester and the reaction of an alkylol amine therewith wherein the modification is such that the resulting product is water-wettable.

Polyalkylene glycols comprise a series of polymers having the general formula $$HO(C_nH_{2n}OC_nH_{2n})xOH$$

wherein $n$ and $x$ are the same or different whole numbers. Polyethylene glycols are currently available in technical quantities and are offered in polymeric grades corresponding to molecular weights of 200, 300, 400, 600, 1000, 1500, 1540, 4000 and 6000. Up to a molecular weight of 600, the materials all are viscous, light colored, somewhat hygroscopic liquids of low vapor pressure and are characterized by complete solubility in water and in many organic solvents. Examples of the latter are aliphatic ketones and alcohols, glycol ethers, aliphatic esters and aromatic hydrocarbons. Structurally, the polyethylene glycols are characterized by a large number of ether linkages and two terminal hydroxyl groups so that they are heat stable and inert to many chemical agents. The higher molecular weight polyethylene glycols are bland, odorless solids. The following are the physical properties of the two polyethylene glycols which are our preferred reactants:

*Polyethylene glycols*

|  | 300 | 400 |
|---|---|---|
| Average Molecular Weight | 285 to 315 | 380 to 420 |
| Freezing Range, Degrees C | −15 to 8 | 4 to 10 |
| Specific Gravity 20/20, Degrees C | 1.13 | 1.13 |
| Flash Point, Degrees F | 385 | 435 |
| Saybolt Viscosity at 210 Degrees F., Sec | 42 to 46 | 45 to 55 |
| Water Solubility at 20 Degrees C., per cent by weight | Complete | Complete |
| Comparative Hygroscopicity (Glycerol=100) | 70 | 60 |

Of the two dissimilar carboxy acids required for esterification, the one is preferably an unsaturated long chain acyclic or fatty type carboxy acid having at least 8 carbon atoms and not more than 32 carbon atoms in the chain. This group of acids may also be called unsaturated detergent-forming acids. As examples of acyclic type acids which we have found particularly suitable for our purposes we may mention: linolenic acid, linoleic acid, oleic acid, mixtures thereof, and other commonly available unsaturated long chain acyclic acids. Of these acids, those having a plurality of double bonds (e. g., linoleic acid and linolenic acid) may also be called drying oil acids. Especially good results have been obtained by the practice of the invention with blown esters derived from polyethylene glycols, and mixtures of drying oil and non-drying (e. g., oleic acid) oil fatty acids, blown to a soft viscous condition.

The other dissimilar type of carboxy acid required for our process is a carbocyclic carboxy acid of the terpene type, preferably a rosin acid. The most commonly available rosin acids are abietic acid and related derivatives derived from naval stores. Other acidic resins, e. g., polymerized rosin, dehydrogenated rosin and cracked copals (for example, run Congo) may be employed.

The dissimilarity of these two types of carboxy acids is characterized by the acyclic type being a long chain carboxy acid, whereas the rosin type is a carbocyclic carboxy acid of the terpene type. In the practice of the invention the weight ratio of the acyclic carboxy acid to the carbocyclic carboxy acid in the mixed ester is preferably within the range of 1:1 to 2:1, the lesser component always being in excess of about 30% of the total carboxy acids.

While any blend of the dissimilar acids can be prepared, our preferred mixture of dissimilar carboxy acids is readily obtainable as a naturally occurring mixture of dissimilar carboxy acids known in the trade as tall oil. Tall oil is the liquid resin obtained in digesting wood to wood pulp in the paper industry. It is a dark brown, viscous liquid containing a crystalline sediment of abietic acid. From the results of several investigators the following principal constituents of tall oil are indicated: resin acids 30–45%, fatty acids 45–60%, unsaponifiable matter 6–12%. The unsaponifiable portion is a yellow viscous oil containing a waxy or pitchy material. The specifications of the particular grade of tall oil which we prefer to use is as follows:

| | |
|---|---|
| Specific gravity (at 15.5 degrees C.) | .9697 |
| Acid number | 164.0 |
| Saponification number | 173.6 |
| Ester number | 9.4 |
| Percent moisture | 0.0 |
| Percent rosin | 39.2 |
| Percent fatty acids (by difference | 52.79 |
|     Percent linolenic acid 19.25 | |
|     Percent linoleic acid 10.5 | |
|     Percent oleic acid 23.04 | |
| Percent unsaponifiable | 8.01 |
| Iodine number | 148.83 |
| Thiocyanogen—iodine number | 91.1 |
| Percent saturated fatty acids | none |
| Percent unsaturated fatty acids | 100 |
| Titer test degrees C. | 5.5 |
| Pour test do | 4.4 |
| Cloud test do | 10–12.8 |

The preparation of the mixed dissimilar carboxy acid esters of polyalkylene glycols or their indicated equivalents is carried out in any of the well known conventional esterification procedures with or without catalysts. We prefer to carry out the esterification reaction by mixing the carboxy bodies and the polyhydroxy bodies in a suitable solvent which is adaptable to azeotropic distillation. It is to be noted that the use of a solvent is not essential but in some instances its use may facilitate the reaction. Likewise, the use of catalysts such as sulfuric acid and other acidic agents may facilitate the reaction.

The proportions of the polyhydric alcohols and carboxy acids and the reaction conditions are calculated to completely esterify the hydroxy groups and to remove by molecular dehydration all of the water corresponding to the hydroxy groups of the polyhydric alcohol. The resultant mixed ester in some cases may contain free carboxy groups (e. g., Examples II and III). In the latter cases, the alkylolamine can undergo an exchange equilibrium in situ and as the ester is formed, rather than stepwise as in the other examples.

In the practice of the invention, the alkylolamine modifies the resinous reaction products to prevent the formation of insoluble, infusible resins. Satisfactory products may be secured by the use of alkylolamines which have been further condensed, molecularly dehydrated, polymerized, or converted to a more complex form by heating at elevated temperatures in the presence or absence of suitable catalysts, or in the presence or absence of acidic salts of multivalent metals (e. g., iron, aluminum, chromium and zinc) which form amphoteric hydroxides. The alkylolamines react with the completely esterified bodies in a manner similar to the reaction of glycerine in the making of superglycerinates from fatty bodies.

Our preferred alkylolamine is triethanolamine which is a viscous and very hygroscopic liquid which boils at 244 degrees C. at 50 mm. A commercial product which is used for the purposes of the invention contains not more than 2.5% monoethanolamine and not more than 15% diethanolamine and not less than 80% triethanolamine. The neutral equivalent of the commercial product will average about 140 and is entirely satisfactory for our purposes. Modification of triethanolamine can be secured by condensing in the presence or absence of zinc chloride and/or other multivalent metallic salts at an elevated temperature with or without molecular dehydration. There is little evidence available to indicate the nature and constitution of the material resulting from the molecular dehydration and/or polymerization of triethanolamine. From the fact that varying proportions of acidic salts such as zinc chloride produce different products, it may be deduced, however, that the metal actually forms a complex with the alkylolamine. This is evidenced by the fact that in one series of preparations 7% zinc chloride by weight of triethanolamine gave a molecularly dehydrated amine product of different characteristics from 1% zinc chloride. By acidic salts is meant those salts having an electronegative charge greater than the electronegative charge of the —OH ion. For the most part these acidic salts are salts of strong acids, e. g., chlorides, nitrates, phosphates, sulfonates, sulfates and sulfamates.

Other examples of suitable primary, secondary and tertiary alkylolamines for these purposes are as follows: diethanolamine, octylethanolamine, cyclohexylethanolamine, diisopropanolamine, triisopropanolamine, 2-amino-2-methyl-1-propanol and polyethanolamines. Recently there has become available a commercial product satisfactory for our purposes designated as "amine residue T" (also called "Polyamine T") which is a still residue from the manufacture of triethanolamine.

For condensing with these mixed esters to yield modified alkyl resins various polybasic carboxy acids are suitable. These may be selected from the group comprising phthalic, terephthalic, citric, malic, maleic, adipic, oxalic, suberic, azelaic and sebacic acids, and homologues thereof, or their anhydrides.

In order to illustrate specifically the new types of materials contemplated for use in accordance with the present invention, the following examples are set forth below as being typical of products suitable for use. It is to be understood, however, that we do not confine ourselves to the specific chemicals, or proportions thereof, set forth in these examples as it will be obvious that equivalents of these chemicals and other proportions may be used without departing from the spirit of the invention or the scope of the appended claims.

EXAMPLE I

Approximately 3900 pounds of tall oil, 2500 pounds of polyethylene glycol 400 and 200 gallons of a suitable hydrocarbon fraction such as $SO_2$ extract are charged into the processing kettle. The temperature is raised with agitation and at about 160 degrees C. an aqueous-like distillate begins to form. Heating is continued until a total of 175 pounds of aqueous distillate has been condensed from the reaction. The maximum temperature reached during the reaction is about 240 degrees C. The reaction mass is then cooled to 80 degrees C. and yields the mixed ester intermediate.

Forty-eight hundred (4800) pounds of this intermediate and 2400 pounds of triethanolamine are charged into the processing kettle and the temperature raised to 175 degrees C. and maintained at that point for three hours. The reaction product is then promptly cooled to about 135 degrees C. At this point 2400 pounds of phthalic anhydride is charged to the kettle and the temperature raised. At a temperature approximating 170 degrees C. an aqueous distillate is secured. Heating with agitation is continued until a total of 432 pounds of aqueous distillate has been secured. The reaction mass is then cooled to approximately 135 degrees C. At this point 450 gallons of a suitable hydrocarbon diluent is added with agitation. The mass is further cooled and 125 gallons of isopropanol are added with stirring to yield the finished product.

EXAMPLE II

Approximately 2700 pounds of tall oil, approximately 1800 pounds of polyethylene glycol 400, approximately 2400 pounds of triethanolamine and 250 gallons of a suitable hydrocarbon diluent are charged into the processing kettle. The temperature is gradually raised with agitation until an aqueous distillate begins to form which should occur at approximately 167 degrees C. The temperature is continued and gradually elevated until a total of 37 gallons of an aqueous distillate has been secured. In the laboratory the aqueous distillate was secured in three hours and at a maximum temperature of 238 degrees C.

This intermediate is cooled to approximately 140 degrees C. and 2480 pounds of phthalic anhydride are added. The temperature is raised immediately and an aqueous distillate begins to form at about 175 degrees C. The temperature is gradually raised until a total of 51 gallons of an aqueous distillate has been secured. In the laboratory this was accomplished in five hours and at a temperature of 247 degrees C. The reaction mass is then cooled to about 110 degrees C. and 350 gallons of a suitable hydrocarbon diluent are introduced into the kettle. The mass is then further cooled to about 75 degrees C., at which point approximately 125 gallons of acetone are added to complete the batch. After further cooling the material is pumped over to yield the finished product.

EXAMPLE III

Twenty-six hundred (2600) pounds of tall oil, 1680 pounds of polyethylene glycol 400, 1680 pounds of diethanolamine and 120 gallons of a suitable hydrocarbon diluent are charged into the processing kettle. The temperature is gradually raised with agitation until an aqueous distillate begins to form, which should occur at approximately 167 degrees C. The temperature is continued and gradually elevated until a total of 30 gallons of an aqueous distillate has been secured. This aqueous distillate was secured in approximately four hours at a maximum temperature of 200 degrees C.

This intermediate is cooled to approximately 140 degrees C. and 2400 pounds of phthalic anhydride are added together with 110 gallons of a suitable hydrocarbon diluent. The temperature is raised immediately and an aqueous distillate begins to form at about 165 degrees C. The temperature is gradually raised until a total of 51 gallons of an aqueous distillate has been secured. This was accomplished in 10 hours and at a maximum temperature of 220 degrees C.

This reaction mass is then cooled to approximately 110 degrees C. and 335 gallons of a suitable hydrocarbon diluent are introduced into the kettle. The mass is then further cooled to about 75 degrees C., at which point 200 gallons of isopropanol are added to complete the batch. After additional cooling the material is pumped over to yield the finished product.

EXAMPLE IV

Six hundred (600) parts of the intermediate mixed ester as prepared in Example I, 150 parts of triethanolamine and 120 parts of a molecularly dehydrated triethanolamine are heated three hours at 175 degrees C. To the heated mass is added 100 parts of a suitable hydrocarbon diluent and 196 parts of maleic anhydride. The temperature is gradually raised until a total of 46 parts of an aqueous-like distillate has been secured. To the resulting product is added 350 parts of a hydrocarbon diluent and 100 parts of isopropyl alcohol to yield the finished product.

EXAMPLE V

Three hundred (300) parts of a fatty acid residue consisting chiefly of oleic and linoleic acids, 300 parts of abietic acid, 200 parts of polyethylene glycol 200 and 200 parts of a suitable hydrocarbon diluent are heated until a total of 24 parts of aqueous-like distillate have been secured.

This intermediate mixed ester was reacted with triethanolamine and phthalic anhydride in accordance with the directions in Example I.

EXAMPLE VI

Six hundred (600) parts of the intermediate mixed ester as prepared in Example I and 300 parts of triisopropanolamine are heated for three hours at 175 degrees C. To the flask was added 100 parts of a suitable hydrocarbon fraction and 296 parts of phthalic anhydride. The temperature was slowly elevated until formation of an aqueous distillate. Heating was continued until a total of 54 parts of an aqueous distillate had been secured. Three hundred twenty-five (325) parts of a hydrocarbon fraction and 100 parts of isopropyl alcohol were added with agitation to yield the finished product.

EXAMPLE VII

The directions of Example VI are followed with the exception of the replacement of 300 parts of triisopropanolamine with 300 parts of "amine residue T."

EXAMPLE VIII

The directions of Example VI are followed with the exception of the replacement of 300 parts of triisopropanolamine with 300 parts of a triethanolamine prepared by condensing and molecularly dehydrating in the presence of zinc chloride.

From the above examples it is to be noted that satisfactory products are secured by manufacturing the intermediate mixed ester prior to the condensation with polybasic acids to yield the modified alkyd resin type. Likewise, equally satisfactory products can be prepared by reacting the desired dissimilar carboxy compounds, the polyhydroxy compounds and the alkylolamine in one step.

The above examples are only a few of the many products which may be prepared according to the principles disclosed in the foregoing discussion. Various examples of the many products which answer the description herein made are contemplated; some may be oil soluble and others water soluble, and in many instances they may possess dual solubility to an appreciable extent. The suitability of any of the products for the breaking and resolving of any given emulsion can readily be determined by conventional procedures. The products may be used as such for resolving emulsions of the water-in-oil type or they may be admixed with other demulsifying reagents in varying ratios as required by the problem at hand.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

For the purpose of the present invention the preferred products are those in which 1 mol of the total ester (both hydroxy groups of the polyhydric alcohol esterified with mixed acids) is modified with from ⅓ mol to 3 mols of alkanolamine and 1 mol of the resultant alkylolamine-modified ester is condensed with from ½ mol to 3 mols of the polybasic carboxy acid.

The improved demulsifying reagents prepared in accordance with the present invention are preferably used in the proportion of one part of reagent to from 2,000 to 30,000 parts of emulsion either by adding the concentrated product directly to the emulsion or after diluting with a suitable vehicle in the customary manner.

The invention is hereby claimed as follows:

1. A composition of matter comprising a modified alkyd resin derived from the reaction of a polycarboxy organic acid, a mixed ester, and an alkylol amine, said mixed ester resulting from the reaction of a polyethylene glycol having a molecular weight within the range from 200 to 600 and a mixture of at least two dissimilar unsaturated monocarboxy organic acids wherein at least one of said acids is a carbocyclic natural resin acid and another is an acyclic monocarboxy acid having at least 8 and not more than 32 carbon atoms in the chain, the weight ratio of said acyclic monocarboxy acid to said carbocyclic monocarboxy acid in the mixed ester being within the range of 1:1 to 2:1 and the lesser of said monocarboxy acids component always being in excess of about 30% of the total monocarboxy acids, the quantity of said unsaturated monocarboxy acids being sufficient to esterify completely the hydroxyl groups of said polyethylene glycol, the proportions of said reactants corresponding to 1 mol of total mixed ester per ⅓ mol to 3 mols of alkylol amine and 1 mol of the resultant alkylol amine-modified ester per ½ mol to 3 mols of said polycarboxy organic acid, said reaction being effected with the elimination of water at a temperature of at least 165° C. to produce a water wettable product.

2. A composition of matter comprising a modified alkyd resin derived from the reaction of a polycarboxy organic acid, a polyethylene glycol having a molecular weight within the range of from 200 to 600, triethanolamine and tall oil, the proportions of said polyethylene glycol and said tall oil being calculated to completely esterify the hydroxyl groups of said polyethylene glycol and the proportions corresponding to 1 mol of the resultant mixed ester per ⅓ mol to 3 mols of triethanolamine and 1 mol of the resultant alkylol amine-modified ester per ½ to 3 mols of said polycarboxy organic acid, said reaction being effected with the elimination of water at a temperature of at least 165° C. to produce a water wettable product.

3. A composition as claimed in claim 1 wherein the polycarboxy organic acid is phthalic anhydride.

4. A composition as claimed in claim 1 wherein the polycarboxy organic acid is maleic anhydride.

5. A composition as claimed in claim 1 wherein the alkylol amine is triethanolamine.

6. A composition as claimed in claim 1 wherein the alkylol amine is diethanolamine.

7. A composition as claimed in claim 1 wherein the alkylolamine is triisopropanolamine.

8. A composition of matter comprising a modified alkyd resin derived from the reaction of a polyethylene glycol having an average molecular weight within the range from 200 to 600, phthalic anhydride, triethanolamine and tall oil, the proportions of said polyethylene glycol and the monocarboxy acids present in said tall oil being calculated to completely esterify the hydroxyl groups of said polyethylene glycol and the proportions corresponding to 1 mol of the resultant mixed ester per ⅓ mol to 3 mols of triethanolamine and 1 mol of the resultant triethanolamine-modified ester per ½ mol to 3 mols of phthalic anhydride, said reaction being effected with the elimination of water at a temperature of at least 165° C. to produce a water wettable product.

9. A composition of matter comprising a modified alkyd resin derived from the reaction of a polyethylene glycol having an average molecular weight of about 400, phthalic anhydride, triethanolamine and tall oil, the proportions of said polyethylene glycol and the monocarboxy acids present in said tall oil being calculated to completely esterify the hydroxyl groups of said polyethylene glycol and the proportions corresponding to 1 mol of the resultant mixed ester per ⅓ mol to 3 mols of triethanolamine and 1 mol of the resultant triethanolamine-modified ester per ½ mol to 3 mols of phthalic anhydride, said reaction being effected with the elimination of water at a temperature of at least 165° C. to produce a water wettable product.

WILLARD H. KIRKPATRICK.
EARL T. KOCHER.

REFERENCES CITED

The following references are of record in the file of this patent:

UNITED STATES PATENTS

| Number | Name | Date |
| --- | --- | --- |
| 2,106,522 | Ellis | Jan. 25, 1938 |
| 2,214,784 | Wayne | Sept. 17, 1940 |
| 2,296,600 | De Groote et al. | Sept. 22, 1942 |

FOREIGN PATENTS

| Number | Country | Date |
| --- | --- | --- |
| 378,596 | Great Britain | Aug. 18, 1932 |